United States Patent [19]

Ammeraal et al.

[11] Patent Number: 5,118,354
[45] Date of Patent: * Jun. 2, 1992

[54] METHOD FOR MAKING BRANCHED CYCLODEXTRINS AND PRODUCT PRODUCED THEREBY

[76] Inventors: Robert Ammeraal, 11661 S. Nagle Ave., Worth, Ill. 60482; Larry Benko, 335 Persimmon Dr., Schererville, Ind. 46375; Ronald Kozlowski, 4156 Sheffield Ave., Hammond, Ind. 46327

[*] Notice: The portion of the term of this patent subsequent to Feb. 14, 2006 has been disclaimed.

[21] Appl. No.: 609,899

[22] Filed: Nov. 6, 1990

Related U.S. Application Data

[60] Continuation-in-part of Ser. No. 467,804, Jan. 19, 1990, Pat. No. 5,032,182. Division of Ser. No. 232,389, Aug. 15, 1988, Pat. No. 4,904,307.

[51] Int. Cl.⁵ .................. C08B 30/18; C13F 3/00; C13F 5/00
[52] U.S. Cl. ........................ 127/40; 127/38; 127/46.1; 127/63; 514/58; 536/103
[58] Field of Search ............ 127/40, 38, 63, 46.1; 536/103; 514/58

[56] References Cited

U.S. PATENT DOCUMENTS

| | | |
|---|---|---|
| 4,303,787 | 12/1981 | Horikoshi et al. |
| 4,668,626 | 5/1987 | Kobayashi et al. |
| 4,781,977 | 11/1988 | Yagi et al. |
| 4,808,232 | 2/1989 | Beesley. |
| 4,840,679 | 6/1989 | Ammeraal et al. |
| 4,871,840 | 10/1989 | Kobayashi et al. |
| 4,904,307 | 2/1990 | Ammeraal et al. ............ 127/40 |
| 4,910,137 | 3/1990 | Kobayashi et al. |

OTHER PUBLICATIONS

Kennedy et al., "Starch and Dextrin" in Whistler et al., Starch Chemistry and Technology, Academic Press NY (1984) pp. 596-599.
Morton "Pyrolysis if Starch" in Whistler et al., Starch Chemistry and Technology, Academic Press NY, vol. I pp. 421-437 (1964).

*Primary Examiner*—Theodore Morris
*Assistant Examiner*—David M. Brunsman

[57] ABSTRACT

Branched cyclodextrins are made from crystalline cyclodextrin in a fluidized state in an acid environment at a temperature between 110° C. and 170° C.

7 Claims, No Drawings

METHOD FOR MAKING BRANCHED CYCLODEXTRINS AND PRODUCT PRODUCED THEREBY

This is a continuation-in-part of U.S. patent application Ser. No. 467,804 filed Jan. 19, 1990 now U.S. Pat. No. 5,032,182 which in turn is a divisional of U.S. patent application Ser. No. 232,389 filed Aug. 15, 1988, now U.S. Pat. No. 4,904,307 issued Feb. 27, 1990.

This invention relates to a method for producing branched cyclodextrins and especially branched beta cyclodextrins and the product produced thereby.

Starch occurs naturally in a variety of plants such as corn, potato, sorghum and rice and is extracted from portions of the plant by a milling operation which separates the starch from the plant. Physically, the starch is in a granular form which typically comprises both amylose and amylopectin.

Amylose is a Linear polymer of anhydroglucose units bonded together by alpha 1,4 glycosidic bonds while amylopectin is a polymer composed of a straight chain of alpha 1,4 anhydroglucose units onto which side chains of alpha 1,4 anhydroglucose polymers are bonded. In amylopectin, the bond between the straight chain and the side chain is an alpha 1,6 glycosidic bond. The amount of amylose and amylopectin in a starch granule depends on the source of the starch. For example, starch obtained from high amylose corn contains about a 50:50 ratio while starch obtained from waxy corn contains about a 99:1 ratio of amylopectin to amylose.

Cyclodextrins, also called Schardinger dextrins, cycloamyloses, cyclomaltoses and cycloglucans, are polymers of anhydroglucose bonded together by alpha 1,4 bonds to form a ringed compound. A six membered ring is called alpha cyclodextrin; seven, beta cyclodextrin; and eight, gamma cyclodextrin. These six, seven and eight membered rings are also referred to as cyclomaltohexaose, cyclomaltoheptaose and cyclomaltooctaose, respectively.

Branched cyclodextrins were described as early as 1965 by French and his co-workers, but had been studied very little until recently. Branched cyclodextrins, as their name implies, have one or more anhydroglucose units bonded onto the ring structure such that a branch extends out from the ring structure.

Conventionally, branched cyclodextrins are obtained by treating a starch slurry high in amylopectin, such as waxy starch, with an enzyme or acid to produce a gelatinized and liquefied starch slurry having a DE between 1 and 5. The gelatinized and liquefied starch slurry is then treated with cyclodextrin glycosyl transferase (CGT), at the appropriate pH, temperature and time for the selected CGT. The enzyme, CGT, is obtained from microorganisms such as *Bacillus macerans, B. magaterium, B. circulans, B. stearothermophilus* and *Bacillus sp.* (alkalophilic) as well as others. The digest from the gelatinized and liquefied starch slurry treated with CGT contains branched cyclodextrins, non-branched cyclodextrins, and acyclic material. This digest typically has a low concentration of branched cyclodextrins. The branched cyclodextrins and cyclodextrins are then typically separated from the digest by a solvent extraction process.

In order to produce predominately beta cyclodextrins and branched beta cyclodextrins, the reaction between CGT and the gelatinized and liquefied starch slurry is conducted under a solvent such as toluene or p-xylene. Such solvents substantially increase the yield of both beta cyclodextrin and branched beta cyclodextrin.

Another method for forming branched cyclodextrins is taught in U.S. Pat. No. 4,668,626 issued May 26, 1987. The '626 patent teaches another enzymatic method for producing branched cyclodextrins.

In both enzymatic treatments to obtain branched cyclodextrins, it is though that the bond between the branch and the cyclodextrin ring is an alpha 1,6 glycosidic bond, the same bond as between the branches and the main chain in amylopectin.

Then, in 1990, U.S. Pat. No. 4,904,307 issued on Feb. 27, 1990. The '307 patent teaches heating dry crystalline cyclodextrin to a temperature between about 135° C. to about 220° C. for a period of time sufficient to produce branched cyclodextrin. Preferably, the cyclodextrins used in the process of the '307 patent are dry as defined therein. It is stated in the '307 patent that the use of dilute mineral acids can be employed in the conversion; however, it is stated that this is not preferred. It is also stated in the '307 patent that the preferred temperature range is about 180° C. to about 190° C.

An improved process for making branched cyclodextrins in a pyrolysis process has now been discovered. It has now been discovered that by converting cyclodextrin to branched cyclodextrin at a lower temperature range than the preferred temperature range of the '307 patent in the presence of an acid catalyst and water while maintaining the reaction components in a fluidized state that superior results to those obtained in the '307 patent are possible. These superior results include better color and higher yields. It was also found that the rate of conversion of cyclodextrin to branched cyclodextrin is faster in the process of the present invention compared to the process of the '307 patented process.

It has also been found that the process of the present invention readily scales up and, specifically, the process of the present invention has been scaled up to produce forty five (45) kilogram batches. As will be appreciated by those of skill in the art, such scale up is important for a commercial application.

Broadly, the process of the present invention comprises fluidizing crystalline cyclodextrin in the presence of an acid catalyst and water at a temperature between about 110° C. to about 170° C. to form a product containing branched cyclodextrins. The branched cyclodextrins are then separated from the product.

The cyclodextrins used in the process of the present invention are from any source of starch and produced by any process. Cyclodextrins are made in a conventional manner. Good results have been obtained using cyclodextrins produced from corn starch.

Conventionally, cyclodextrins are made by forming an aqueous solution of starch at a concentration up to about 35% by weight solid. The slurry is then subjected to gelatinization and liquefaction by enzyme or acid to a DE from about 1 to about 5. The preferred enzyme for liquefaction is bacterial alpha amylase. Next, a selected CGT is added to the gelatinized and liquefied slurry and the pH, temperature and time of the treatment are adjusted depending on the selected CGT. Generally, the pH is between about 4.5 to about 8.5, and the temperature ranges from ambient to about 75° C. The time of reaction runs for about ten hours to seven days. Cyclodextrins are then separated from solution by precipitation in a conventional manner. Commericial sources of cyclodextrins are available.

Alpha, beta and gamma cyclodextrins are used in the present invention either as a mixture or individually. Preferably, only one type of cyclodextrin is used in the process and the types are not mixed. Good results have been obtained with beta cyclodextrin.

The cyclodextrins must be in the crystalline form and washed free of non-carbohydrate impurities. If the cyclodextrins are not in the crystalline form, they must be crystallized. Crystallization is accomplished in a conventional manner by forming a solution of cyclodextrins and cooling the solution and holding it in a cooled state for about two days. Crystals form from the cooled solution. Then the crystals are washed in a conventional manner to remove the non-carbohydrate impurities.

The process of the present invention must be conducted in the presence of water. Specifically, the cyclodextrin should have a moisture level greater than about 5% and preferably between about 5% and about 20%. More preferred, the cyclodextrin used in the present invention has a moisture content of about 11% to about 15%. Good results have been obtained when the cyclodextrin used in the process of the present invention had a moisture content of about 12%. Moisture content is measured in a conventional manner.

It has been found that the cyclodextrin used in the process of the present invention, although starting with a moisture content as stated above, dries out during the conversion. Once the water has been eliminated, the conversion by means of acid stops. If additional conversion is desired, the temperature must be raised to above about 170° C.; however, conversion at such a high temperature has been found to result in formation of a colored product. Alternatively, to continue the conversion of cyclodextrins to branched cyclodextrins in the presence of acid, additional moisture is added to maintain the moisture content of the cyclodextrin, during reaction, to within the above stated ranges. This need for moisture in the process of the present invention has been found to be in direct contradiction to the process of the '307 patent which is conducted on dry cyclodextrin. Specifically, it has been found that in the absence of acid, as taught by the process of the '307 patent, that during the conversion of the cyclodextrins to branched cyclodextrins the moisture level drops to below about 3.0% before conversion of the cyclodextrins to branched cyclodextrins starts to occur.

The fact that conversion ceases when moisture is no longer present in the process of the present invention gives an advantage over the process of '307 where overconversion and melting can occur. In other words, the process is self-limiting.

The crystallized cyclodextrin, no matter whether it is alpha, beta, or gamma, should be substantially free of non-carbohydrate materials and acyclic carbohydrate materials. Good results have been obtained with crystalline cyclodextrins having a purity of above about 95% by weight.

Preferably, the size of the crystals should be such that the crystals pass through a 100 mesh screen; however, they should not be so small as to cause a dusting problem.

The conversion should be conducted at a temperature between about 110° C. to about 170° C. A more preferred temperature is about 120° C. to about 140° C. and good results have been obtained at a temperature of about 130° C.

Time for such a reaction depends on the moisture level, pH of cyclodextrins and temperature. Typically, about one to about three hours are needed. At about 130° C. and a moisture level of about 12%, it has been found that the water disappears after about one to about two hours and that the conversion ceases. The process is generally conducted at ambient pressure.

The conversion is carried out in the presence of an acid catalyst, such as dilute mineral acid, calcium chloride, aluminum chloride, phosphorous acid, chlorine and monochloracetic acid. Preferably a dilute mineral acid such as hydrochloric, sulfuric or nitric acid is used. The preferred mineral acid is hydrochloric acid and good results have been obtained using hydrogen chloride gas. The amount of acid catalyst used is sufficient to adjust the pH to between about 1.0 and about 6.0 and more preferably between about 1.5 and about 5.0. Good results have been obtained with a pH of about 3.0.

In order to maintain the cyclodextrins in a fluidized state during conversion, conventional equipment is employed. Good results have been obtained with a dextrin cooker sold under the name Littleford which is a horizontally oriented cooker with a paddle arrangement and air purge that maintains the cyclodextrins in a fluidized state. The cooker is operated in a standard manner.

After the conversion, the product is removed from the reactor and allowed to cool to ambient temperature.

Finally, the branched cyclodextrins must be separated from the other components of the process. Any conventional method of separation is employed.

A practical method for separating the branched cyclodextrins from the non-branched cyclodextrins is described in U.S. Pat. No. 4,840,679 issued Jun. 20, 1989, incorporated herein by reference.

Broadly, the '679 patent teaches a separation process for separating branched beta cyclodextrins from acyclic and beta cyclodextrins comprising: forming a first precipitate and a first liquor from a first aqueous solution containing branched beta cyclodextrin by the addition of a beta cyclodextrin complexant to the first solution; recovering the first precipitate; forming a second aqueous solution with the first precipitate; forming a second solution by the addition of a beta cyclodextrin complexant to the second solution; recovering the second liquor; and finally, recovering branched beta cyclodextrins from the second liquor.

Preferably, the branched cyclodextrins are separated from the non-branched cyclodextrins as taught in U.S. patent application Ser. No. 232,307 filed Aug. 15, 1988, now U.S. Pat. No. 5,007,967 incorporated herein by reference. This application teaches separating branched cyclodextrins from non-branched cyclodextrins by passing the mixtures through a matrix onto which an inclusion compound has been bound. The branched cyclodextrins and cyclodextrins are sequentially eluted from the column.

Once the branched cyclodextrins are separated from the other components of the product, the unreacted cyclodextrins are preferably reused in the conversion step.

These and other aspects of the present invention may be more fully understood by reference to the following examples.

EXAMPLE 1

This example illustrates making a branched beta cyclodextrin without an acid catalyst and without fluidization.

Crystalline beta cyclodextrin crystals, in an amount of 46.5 lbs. (10.2% moisture), were placed in a 35 liter jacketed heating vessel equipped with an agitator. The agitator had a shaft with two 45° angle blades on the shaft. The vessel was operated at 200° C. and the beta cyclodextrin crystals were maintained at 190° C. for 3.2 hours.

After the 3¼ hour period, the contents of the pot were removed and branched beta cyclodextrin separated. Table I below lists the results:

TABLE I

| | |
|---|---|
| % formed of branched beta cyclodextrin | 7.8 |
| % Beta cyclodextrin degraded during heating | 22.8 |
| % degraded beta cyclodextrin converted to branched beta cyclodextrin | 34.2 |
| % unreacted beta cyclodextrin | 77.2 |
| % purified branched cyclodextrin recovered | 5.3 |
| Color* | |
| Hunter Whiteness | −8.4 |
| Hunter Blue | 55.9 |

*The test for color used a reflectance spectrophotometer manufactured by Hunter Labs.

The purified branched cyclodextrin product from this conversion was visually yellow in color. The product was subjected to a conventional carbon bleach treatment and ion exchange treatment in an attempt to obtain a colorless product. However, such treatment did not result in a colorless product.

EXAMPLE 2

This example illustrates making a branched cyclodextrin wherein the conversion takes place with an acid catalyst in the presence of water. The cyclodextrins during conversion are maintained in a fluidized state.

Into a cooker made by Littleford Company 45.2 Kg. (99.5 lbs., 12% moisture) of crystalline beta cyclodextrin was placed. The cooker was closed and hydrogen chloride gas was added to lower the pH to 3.1. The cooker mixer shaft was rotated at 150 rpm with an air purge so as to maintain the acidified cyclodextrin in a fluidized state. The cooker had a steam heated jacket in which 150 psi steam was injected allowing for a maximum temperature of 175° C. The temperature of the contents of the cooker, after acid addition, rose from 64° C. to 167° C. during the conversion. The contents of the cooker were sampled at 1.0, 1.5, 2.0 and 2.2 hours. The results of the sampling are listed in Table II below:

TABLE II

| | 1.0 hr. | 1.5 hr. | 2.0 hr. | Final (2.2 hr.) |
|---|---|---|---|---|
| Temperature (°C.) | 125 | 137 | 162 | 167 |
| Moisture (%) | 9% | 2.4% | 1.0% | 1.0% |
| Reducing sugars (DE)* | 0.0 | 3.9 | 2.1 | 1.8 |
| Hunter Whiteness | 93.7 | 89.3 | 13.8 | 9.3 |
| Hunter Blue | — | 97.3 | — | — |
| % Acyclic | 1.0 | 24.8 | 46.1 | 49.3 |
| % Branched beta cyclodextrin | 2.4 | 22.0 | 29.8 | 27.4 |
| % Beta cyclodextrin | 96.6 | 53.2 | 24.1 | 23.3 |
| % Purified branched cyclodextrin recovered | — | 20.9 | — | — |

*Lane-Eynon

By comparing the results in Table II at 1.5 hours to the results in Table I, it can be seen that the color of branched beta cyclodextrin made in accordance with the present invention is whiter than branched beta cyclodextrin made by another process. It can be seen that the amount of branched beta cyclodextrin made in Example 2 is about three times that made in Example 1. It is also readily apparent that both time and temperature in Example 2 are less than in Example 1.

EXAMPLE 3

Using the cooker of Example 2 above, 45.4 Kg (100 lbs., 12% moisture) of beta cyclodextrin were acidified with hydrogen chloride gas to a pH of 3.0. Samples were taken throughout the conversion and the results are listed in Table III below:

TABLE III

| Sample | 1 | 2 | 3 | 4 | 5 | 6 | 7 |
|---|---|---|---|---|---|---|---|
| Time (hr.) | 0 | 0.5 | .75 | 1.0 | 1.125 | 1.75 | 2.0 |
| Temperature (°C.) | 113 | 112 | 127 | 129 | 130 | 130 | 129 |
| Moisture (%) | 7.6 | 2.8 | — | 0.2 | — | — | — |
| Reducing Sugars (DE)[1] | .32 | 1.40 | 3.50 | 3.40 | 5.14 | 2.52 | 2.33 |
| Relative Color[2] | 1.0 | 1.6 | 3.3 | 6.6 | 9.5 | 12.7 | 13.4 |
| % Acyclic | 0 | 9.8 | 24.2 | 34.5 | 36.1 | 37.4 | 37.6 |
| % Branched beta CD | 0 | 8.6 | 19.1 | 23.7 | 22.9 | 23.0 | 22.0 |
| % Beta cyclodextrin | 100 | 81.6 | 56.7 | 41.8 | 41.0 | 39.6 | 40.3 |

1 - Lane-Eynon
2 - Pacific Scientific Y value   Color at time '0' was 0.64 and was set at 1.0

As will be evident to one of skill in the art, the method to produce branched cyclodextrins is similar in some respects to the production of dextrins from starch by pyrolysis.

It will be understood that the preferred embodiments of the present invention herein chosen for the purpose of illustration are intended to cover all changes and modifications of the preferred embodiments of the present invention which do not constitute a departure from the spirit and scope of the invention.

What is claimed is:

1. A process for making branched cyclodextrin comprising:
   (a) heating crystalline cyclodextrin to a temperature between about 110° C. to about 170° C. in the presence of an acid catalyst and water while maintaining the cyclodextrin, catalyst and water in a fluidized state to form a product containing branched cyclodextrin; and
   (b) separating branched cyclodextrin from the product.

2. The process of claim 1 wherein the crystalline cyclodextrin is beta cyclodextrin and the branched cyclodextrin is branched beta cyclodextrin.

3. The process of claim 1 wherein the acid catalyst is a mineral acid.

4. The process of claim 1 wherein the acid catalyst is hydrogen chloride gas.

5. The process of claim 1 wherein the pH of the cyclodextrin after addition of the acid catalyst is about 1.0 to about 6.0.

6. A process for making branched cyclodextrin comprising the steps of:
   (a) fluidizing a crystalline cyclodextrin in an acid environment while heating the fluidized cyclodextrin to a temperature between about 110° C. to 170° C. for about 1 to about 3 hours to produce branched cyclodextrin; and
   (b) recovering the branched cyclodextrin.

7. The process of claim 6 wherein the cyclodextrin is beta cyclodextrin.

* * * * *